(12) United States Patent
Elyasi et al.

(10) Patent No.: US 11,669,754 B2
(45) Date of Patent: Jun. 6, 2023

(54) DATA MANAGEMENT, REDUCTION AND SAMPLING SCHEMES FOR STORAGE DEVICE FAILURE

(71) Applicant: SAMSUNG ELECTRONICS CO., LTD., Suwon-si (KR)

(72) Inventors: Nima Elyasi, San Jose, CA (US); Vikas Sinha, Sunnyvale, CA (US); Qinling Zheng, San Jose, CA (US); Changho Choi, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 429 days.

(21) Appl. No.: 16/872,194

(22) Filed: May 11, 2020

(65) Prior Publication Data

US 2021/0264298 A1 Aug. 26, 2021

Related U.S. Application Data

(60) Provisional application No. 62/981,348, filed on Feb. 25, 2020.

(51) Int. Cl.
| | | |
|---|---|---|
| *G06F 21/00* | (2013.01) | |
| *G06N 5/04* | (2023.01) | |
| *G06F 16/23* | (2019.01) | |
| *G06N 20/00* | (2019.01) | |
| *G06Q 10/0631* | (2023.01) | |

(52) U.S. Cl.
CPC ........... *G06N 5/04* (2013.01); *G06F 16/2379* (2019.01); *G06N 20/00* (2019.01); *G06Q 10/06315* (2013.01)

(58) Field of Classification Search
CPC ...... G06N 5/04; G06N 20/00; G06F 16/2379; G06F 11/3037; G06F 11/004; G06F 11/008; G06F 11/3034; G06F 11/3466; G06F 3/0616; G06F 3/0619; G06F 3/0653; G06F 3/0679; G06F 11/1008; G06Q 10/06315; G06K 9/6223; G06K 9/6247; G06K 9/6267
See application file for complete search history.

(56) References Cited

U.S. PATENT DOCUMENTS 8,516,343 B2   8/2013 Flynn et al.
8,887,027 B2   11/2014 Schuette et al.
(Continued)

FOREIGN PATENT DOCUMENTS

WO    WO 2018/092924 A1    5/2018

OTHER PUBLICATIONS

Iwashita, Adriana Sayuri, et al., "An Overview on Concept Drift Learning," IEEE Access, vol. 7, 2019, pp. 1532-1547.

*Primary Examiner* — Mahfuzur Rahman
(74) *Attorney, Agent, or Firm* — Lewis Roca Rothgerber Christie LLP

(57) ABSTRACT

In a method for training a machine learning model, the method includes: segmenting, by a processor, a dataset from a database into one or more datasets based on time period windows; assigning, by the processor, one or more weighted values to the one or more datasets according to the time period windows of the one or more datasets; generating, by the processor, a training dataset from the one or more datasets according to the one or more weighted values; and training, by the processor, the machine learning model using the training dataset.

20 Claims, 5 Drawing Sheets

(56) References Cited

U.S. PATENT DOCUMENTS

| | | |
|---|---|---|
| 8,892,478 B1 | 11/2014 | Bickford et al. |
| 9,189,309 B1 | 11/2015 | Ma et al. |
| 2008/0250265 A1 | 10/2008 | Chang et al. |
| 2014/0181585 A1 | 6/2014 | Hoang et al. |
| 2019/0108888 A1 | 4/2019 | Sarkar et al. |
| 2019/0155682 A1 | 5/2019 | Sinha et al. |
| 2020/0104200 A1* | 4/2020 | Kocberber ............. G06N 3/082 |
| 2021/0124502 A1* | 4/2021 | Elyasi ................... G06F 3/0619 |
| 2021/0203157 A1* | 7/2021 | Visweswariah ........ G06N 20/00 |
| 2022/0066897 A1* | 3/2022 | Elyasi .................... G06F 3/064 |
| 2022/0100187 A1* | 3/2022 | Isik .................... G05B 23/0283 |

* cited by examiner

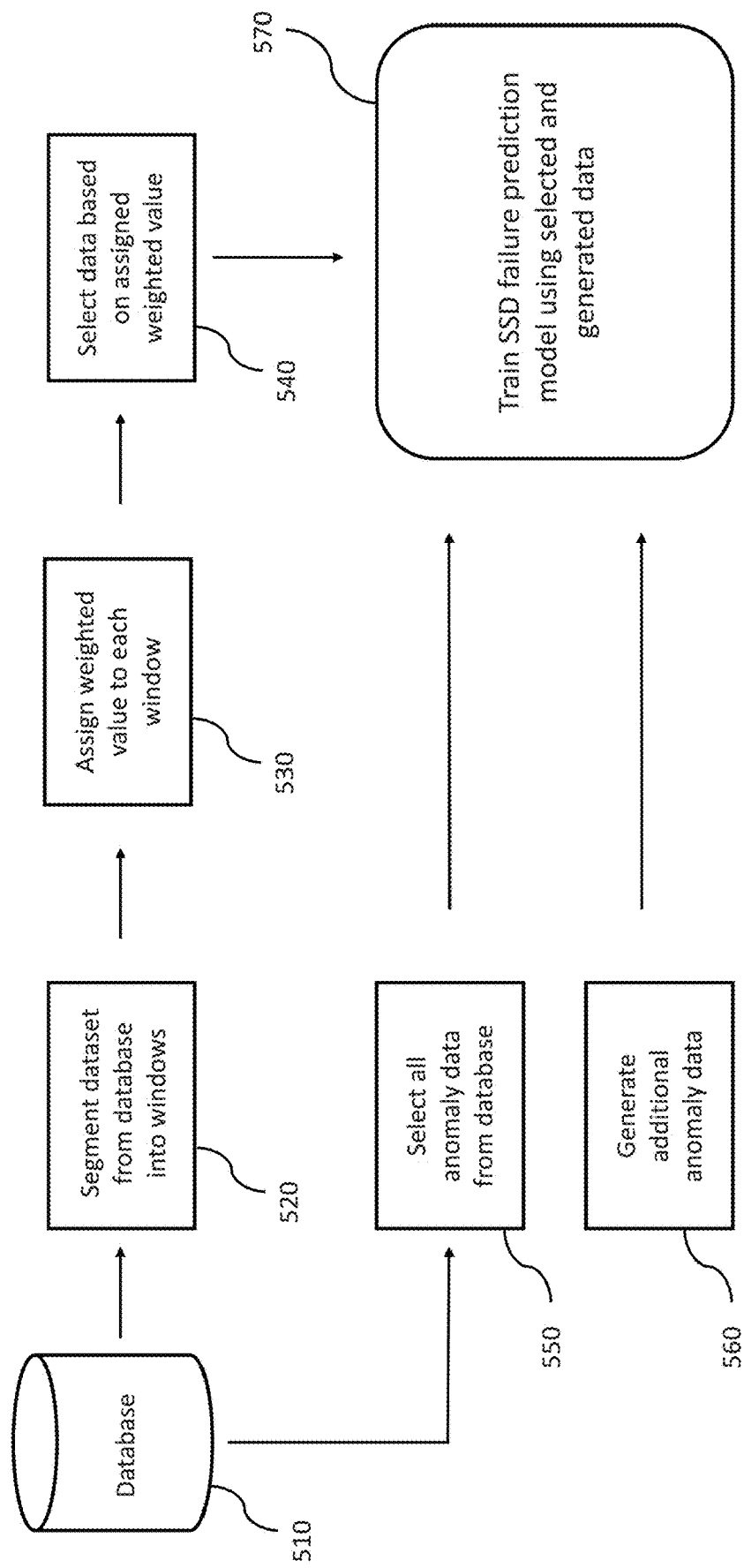

DATA MANAGEMENT, REDUCTION AND SAMPLING SCHEMES FOR STORAGE DEVICE FAILURE

CROSS-REFERENCE TO RELATED APPLICATION(S)

This application claims priority to and the benefit of U.S. Provisional Patent Application No. 62/981,348 filed Feb. 25, 2020 and entitled DATA MANAGEMENT, REDUCTION AND SAMPLING SCHEMES FOR ONLINE RE-TRAINING OF SSD FAILURE PREDICTION MODEL, the entire content of which is incorporated herein by reference.

FIELD

One or more aspects of embodiments according to the present disclosure relate to systems and methods for data management, and more specifically, to systems and methods for data management, reduction and sampling schemes for storage device failure.

BACKGROUND

A data center system may use a relatively large number of storage devices such as solid state drives (SSDs) in order to store and retrieve data. Over time, the components of the data center system may need to be monitored for performance and functionality, and periodically, SSDs may be replaced as the storage devices fail or in anticipation of failure. Further, the SSDs may be replaced in order to allow the data center system to continue functioning with minimal data loss or interruptions of service.

The above information disclosed in this Background section is only for enhancement of understanding of the background of the present disclosure, and therefore, it may contain information that does not form prior art.

SUMMARY

Aspects of embodiments of the present disclosure are directed toward a system and method for data management, reduction and sampling scheme for storage device failure.

According to some example embodiments of the present disclosure, in a method for training a machine learning model, the method including: segmenting, by a processor, a dataset from a database into one or more datasets based on time period windows; assigning, by the processor, one or more weighted values to the one or more datasets according to the time period windows of the one or more datasets; generating, by the processor, a training dataset from the one or more datasets according to the one or more weighted values; and training, by the processor, the machine learning model using the training dataset.

According to some example embodiments, the machine learning model includes a solid-state drive (SSD) failure prediction model.

According to some example embodiments, a most recent dataset from the one or more datasets is assigned a first weighted value and a least recent dataset from the one or more datasets is assigned a second weighted value, wherein the first weighted value is greater than the second weighted value.

According to some example embodiments, the one or more weighted values decrease by a set amount from the first weighted value to the second weighted value.

According to some example embodiments, the method further including: identifying, by the processor, anomaly data in the dataset; retrieving, by the processor, the anomaly data in the dataset; and adding, by the processor, the anomaly data to the training dataset.

According to some example embodiments, the anomaly data includes SSD failure data.

According to some example embodiments, the anomaly data is identified using a rule based method.

According to some example embodiments, the anomaly data is identified using a cluster based method.

According to some example embodiments, the method further including generating, by the processor, anomaly data; and adding, by the processor, the generated anomaly data to the training dataset.

According to some example embodiments of the present disclosure, a data system including: a database; a processor coupled to the database; and a memory coupled to the processor, wherein the memory stores instructions that, when executed by the processor, cause the processor to: segment a dataset from the database into one or more datasets based on time period windows; assign one or more weighted values to the one or more datasets according to the time period windows of the one or more datasets; generate a training dataset from the one or more datasets according to the one or more weighted values; and train a machine learning model using the training dataset.

According to some example embodiments, the machine learning model includes a solid-state drive (SSD) failure prediction model.

According to some example embodiments, a most recent dataset from the one or more datasets is assigned a first weighted value and a least recent dataset from the one or more datasets is assigned a second weighted value, wherein the first weighted value is greater than the second weighted value.

According to some example embodiments, the one or more weighted values decrease by a set amount from the first weighted value to the second weighted value.

According to some example embodiments, the processor is further configured to: identify anomaly data in the dataset; retrieve the anomaly data in the dataset; and add the anomaly data to the training dataset.

According to some example embodiments, the anomaly data includes SSD failure data.

According to some example embodiments, the anomaly data is identified using a rule based method.

According to some example embodiments, the anomaly data is identified using a cluster based method.

According to some example embodiments, the processor is further configured to: generate anomaly data; and add the generated anomaly data to the training dataset.

According to some example embodiments of the present disclosure, in a method for training a machine learning model, the method including: identifying, by a processor, anomaly data in a dataset from a database; generating, by the processor, anomaly data; adding, by the processor, the generated anomaly data to the dataset; identifying, by the processor, a training dataset from the dataset; retrieving, by the processor, the training dataset from dataset; and training, by the processor, the machine learning model using the training dataset.

According to some example embodiments, the machine learning model includes a solid-state (SSD) failure prediction model.

BRIEF DESCRIPTION OF THE DRAWINGS

FIG. 5 illustrates a flow diagram illustrating examples operations for training an storage device failure prediction model using a modified dataset, in accordance with example embodiments of the disclosure.

DETAILED DESCRIPTION

Figure 1:
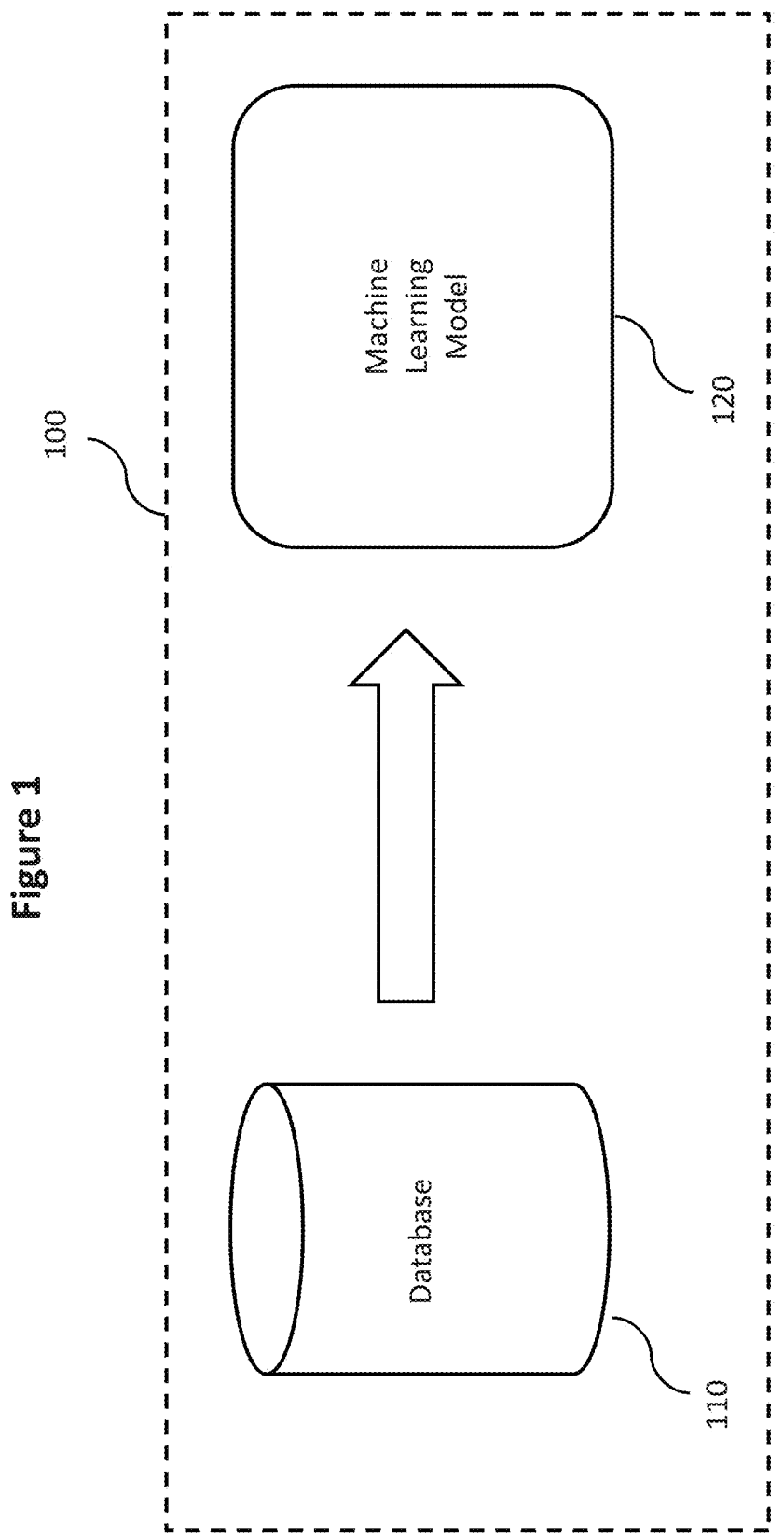
FIG. 1 shows an overview of a data center system, in accordance with example embodiments of the disclosure.

Accurate prediction of storage device (e.g., solid state drive, SSD) failure is valuable to data center administrators since it can allow them to have more efficient operation through proactive planning and replacement, before the failure is actually experienced. A machine learning model may be used to predict whether an SSD may fail in the future (e.g., storage device failure prediction model). However, one of the challenges in developing a machine learning model to predict the SSD failures may include incorporating information that is collected from SSDs in the prediction model in order to achieve higher accuracy in the prediction. Relying on static model training, including a model that is trained once, and deploying such a model in the datacenter to predict failures can lead to inefficient device failure prediction.

For example, as SSDs (and their sub-components) age, the SSD's performance characteristics may change over the time. For example, individual blocks within an SSD may become more likely to fail as more and more read and write operations are performed as the SSD ages. If a given failure prediction model is trained once, based on the dataset available at the time of training, future changes in characteristics of components of the system may not be incorporated in the model, which may result in lower efficiency. For example, over time, the firmware for individual drives may be updated, and hence, different devices may operate differently. Thus, a retraining of the failure prediction model may be useful in order to capture such changes in operation and the corresponding impact on the life span of the SSDs.

Additionally, as additional devices are incorporated into the system over the time—whether with the same or different set of features—it may be useful for the devices' corresponding log information to be included in the training dataset.

Further, SSDs can have more robust lifespans and functionality. Accordingly, failure prediction models may benefit from updates to the training dataset due to such changes in characteristics of more technologically advanced components being incorporated into the data center system.

Additionally, workloads imposed on SSDs in a data center system may change over time which may impact, for example, the rate of deterioration of individual SSDs in the system. Thus, a retraining of failure prediction model may be beneficial.

In view of the above example inefficiencies associated with a single-time trained model, aspects of some example embodiments disclosed herein may enable capturing workload and device dynamics and hence provide better storage device failure prediction. However, there may be at least two challenges when employing an online retraining: 1) the frequency at which the retraining should happen and 2) the relatively large amount of data to be used for (re)training. Since the amount of data that is being collected from the SSDs in the datacenters may grow over time, using all or a large portion of the historically generated data to retrain the model every time or a majority of the time may be inefficient due to data storage requirements and/or the amount of time that may be spent on re-training.

Embodiments of the present disclosure may enable a system for efficiently managing the amount of data used for training a storage device failure prediction model while providing relatively high accuracy in predicting SSD failures.

According to various embodiments, the disclosure is directed toward a system and method for optimizing the dataset used for retraining a storage device failure prediction model. A storage failure prediction model is a machine learning model that can be used to predict whether an SSD may fail in the future. However, training storage device failure prediction models may use a relatively large amount of data and may involve frequent retraining, for example, due to dynamically-changing parameters. In some embodiments, various methods may be used to enhance the dataset used for training the storage device failure prediction model. In other embodiments, the amount of training data can be reduced by using a window-based weighted data sampling scheme to select a smaller amount of data according to the recency of the data. In some embodiments, data that can be used for training the storage device failure prediction model may include instances of storage device failure, anomalies, and outliers (e.g., relevant data points from a relevant dataset). In some embodiments, the anomalies and outliers can be identified using anomaly detection algorithms, rule-based methods, cluster-based methods, combinations thereof, and/or the like. In some embodiments, datasets may be unbalanced because the datasets may only incorporate a small percentage of relevant data points. In some instances, about 0.01% to about 0.02% of the dataset may include relevant data points. Unbalanced datasets may be improved by generating synthetic instances associated with the relevant data points using a rule-based method or an instance-based method. In some embodiments, relevant data points can be identified and indexed for efficient retrieval. In some embodiments, the data processing and preparation may be performed on near storage devices such as proximally connected SSDs and/or SSDs with embedded processors.

FIG. 1 shows an overview of a data center system, in accordance with example embodiments of the disclosure.

Referring to FIG. 1, a data center system 100 may include a database 110 and a machine learning model 120. Data from the database 110 may be used to train the machine learning model 120. The accuracy and reliability of the machine learning model 120 may be dependent on the quality of the data in the database 110. A higher quality dataset can yield a more reliable and accurate machine learning model 120. In addition, training machine learning models may use relatively large amounts of data and relatively large amounts of processing power.

In some embodiments, the training of the machine learning model and the processing of the training data may be performed by a processor such as a central processing unit (CPU). In other embodiments, the machine learning model training and data processing may be offloaded to a nearby storage device (e.g., storage devices within a predetermined physical distance or sharing a virtual resource or classification with a given storage device (or similar)) such as a nearby SSD or a nearby SSD with an embedded processor.

In some embodiments, a machine learning model 120 can be used to predict whether a storage device fails within a predetermined time window (e.g., a storage device failure prediction model). According to this embodiment, relevant data for training a storage device failure prediction model may include anomalous data points (e.g., anomalies). Anomalies may include SSD failure data (e.g., instances of prior SSD failure) and other data that have a relatively small probability of occurring.

However, storage device failure prediction models may be subject to frequent retraining due to dynamically-changing parameters. In some embodiments, the storage device failure prediction model may need to be retrained periodically, for example, once a week or once a month. Some non-limiting examples of the nonstationary parameters may include aging of the SSDs and changing of SSD's wear-level characteristics. Additionally, firmware updates can affect the behavior of the SSDs and impact the lifetime of the SSD. Moreover, technological modification can be introduced to the devices over time that may change parameters that are not reflected in the model as originally trained. Further, the workloads of the devices can change overtime. By way of example, a model may be trained for a certain type of workload, and over the course of a month, the workload may change to be more write intensive.

Retraining a storage device failure prediction model can be difficult in some cases. For example, retraining may involve collecting relatively large amounts of data from devices over a relatively long period of time. In some instances, data may be collected from millions of devices over a period of several years. This can account for several gigabytes or terabytes of data. Additionally, the dataset may be unbalanced because the data may only incorporate a small percentage of anomaly data. Anomaly data may include instances of SSD failure or may be defined by a user. In some instances, anomaly data may make up around 0.01% to about 0.02% of the entire dataset, which may adversely impact the accuracy of the storage device failure prediction model.

Figure 2:
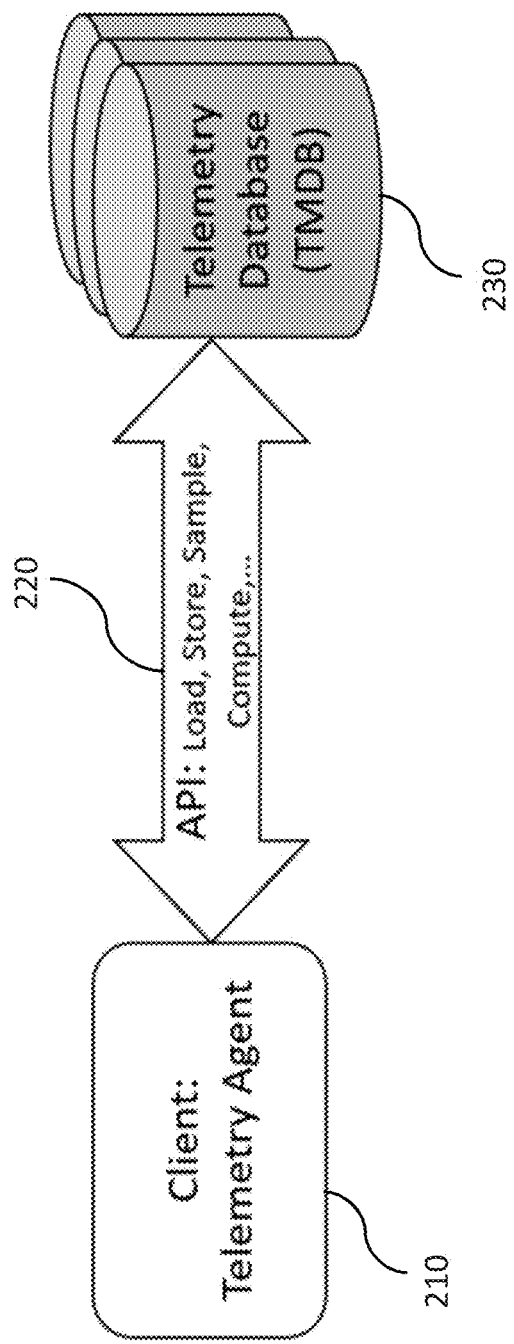
FIG. 2 shows a data center system that can be used for enhancing a dataset used for training a storage device failure prediction model, in accordance with example embodiments of the disclosure.

FIG. 2 shows a data center system that can be used for enhancing the dataset used for training a storage device failure prediction model, in accordance with example embodiments of the disclosure.

Referring to FIG. 2, a client 210 (e.g., telemetry client) can interact with the data in a database 230 (e.g., telemetry data) through an application protocol interface (API) 220. The API 220 may allow the client to extract particular datasets with particular properties from the database 230. For example, the client 210 may use the API 220 to request that data points where the temperature of a storage device is greater than about 100 degrees Fahrenheit, and the API 220 can return data points with this property. In some embodiments, the API 220 can also allow the client to store data to the database or offload computing of the data to a nearby device (e.g., storage devices within a predetermined physical distance or sharing a virtual resource or classification with a given storage device (or similar)) such as a nearby SSD and nearby SSDs with embedded processors.

According to various embodiments, training data for a storage device failure prediction model can be enhanced using a various approaches. In some embodiments, the large amounts of data can be reduced by selecting a smaller amount of data based on the recency of the data (e.g., a window-based approach). According to this approach, greater weight can be placed on more recent data. Recent data can more accurately represent the drive status and workload characteristics. Optimizing by heavy-weight training process, can serve to (i) reduce the processing requirements for the retraining, thereby reducing the associated costs, (ii) reduce the amount of time spent for re-training, and (iii) allow more frequent re-training, which can in turn, result in higher performance and accuracy of the prediction model.

Figure 3:
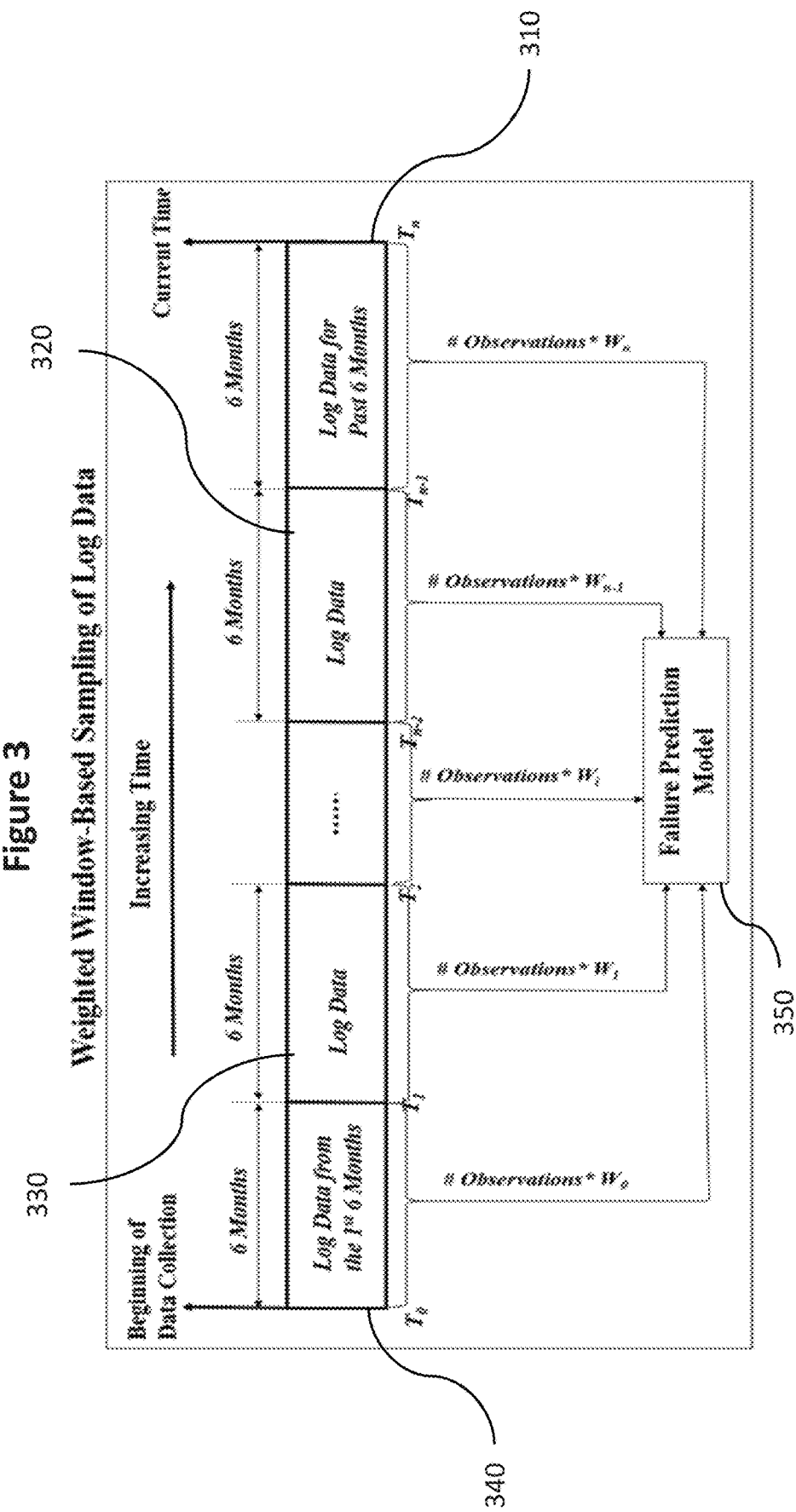
FIG. 3 shows a diagram illustrating exemplary operations for collecting a dataset for training a storage device failure prediction model using a window-based data sampling approach, in accordance with example embodiments of the disclosure.

FIG. 3 shows a diagram illustrating exemplary operations for collecting a dataset for training a storage device failure prediction model using a window-based data sampling approach, in accordance with example embodiments of the disclosure.

Referring to FIG. 3, the log data can segmented into periods of time (e.g., time period windows), for example, six-month windows. Embodiments according to the present disclosure, however, are not limited thereto, and the duration of the periods of time may vary according to the design of the storage device failure prediction model. Window 310 may include data that was logged during the most recent six-month period, between Tn and Tn−1. Window 320 may include data that was logged during the next most recent six-month period, between Tn−1 and Tn−2. The data can to be segmented into six-month windows to the beginning of the data collection, T0. For example, window 340 may include data that was logged during the first six-month period, between T0 and T1. Window 330 may include data that was during the second six-month period, between T1 and T2. According to some example embodiments, the data may be segment into other time period windows (e.g., one month periods). The time period value may be based on the dataset size and/or overall time period of the data.

In some embodiments, the data can be assigned a weighted value based on the window from which the data is collected. In some embodiments, window 310 can be assigned the greatest weight (e.g., one) because it includes the most recent data, while window 340 can be assigned the lowest weight (e.g., zero) because it contains the least recent data. As mentioned previously, recent data is more valuable because recent data more accurately represents the drive status and workload characteristics. The weighted value of each window can decrease from the most recent data to the least recent data. IN some embodiments, the weighted value of each window can decrease by a set amount from the most recent data to the least recent data. In some embodiments, the weighted value may decrease by one half for each window from the most recent data to the least recent data. In other embodiments, the weighted value may decrease by one third for each window when moving from the most recent data to the least recent data.

For example, as shown in FIG. 3, data collected from window 310 may be assigned a weighted value Wn. Data collected from window 320 may be assigned a weight value Wn−1. Data collected from window 330 may be assigned a weighted value W1. Data collected from window 340 may be assigned a weight value W0.

Various schemes for assigning weighted values can be implemented according to various example embodiments. In some embodiments, the weighted values can be set as the following:

$$W_n = 1$$

$$W_{n-1} = \frac{1}{2}$$

$$W_{n-2} = \frac{1}{4}$$

$$\vdots$$

$$W_0 = \frac{1}{2^n}$$

According to this embodiment, the weighted values decrease by half for each window. For example, the most recent six-month period can be assigned a weighted value of one, which indicates that data from the past six-months may be included in the storage device failure prediction model 350. The next six-month period may be assigned a weighted value of one half, which indicates that one half of data from this six-month window may be included in the storage device failure prediction model 350. The next six-month period may be assigned a weighted value of one fourth, which indicates that one fourth of data from this six-month window may be included in the storage device failure prediction model 350. According to this embodiment, the total amount of data used for retraining every time is equal to: $1+\frac{1}{2}+\frac{1}{4}+\ldots+(\frac{1}{2})^{\wedge}n$. As time goes by and n increases, the sum of all weights converges to two, which is equivalent to the data collected in one year (2*6 months). Thus, regardless of the total amount of data collected over the years, the amount of data used for retraining can be less than or equal to the data collected in one year. By way of example, twenty years of data can be reduced or sampled to one year of data.

In addition, according to this embodiment, SSD failure data from the database may be collected and retained regardless of its weighted values. Datasets associated with failure prediction models may be inherently unbalanced and can include a small amount of SSD failure data (e.g., 0.01%-0.02%). Collecting SSD failure data can improve the accuracy of the storage device failure prediction model.

The training dataset may be further enhanced by preserving relevant data (e.g., by pruning the dataset). In some embodiments the relevant data points may include anomalies. Anomalies may include instances of SSD failures but may also include other data points that have a small probability of occurring (e.g., outliers). The anomalies may be identified by anomaly detection algorithms such as auto encoder techniques and isolation forest techniques, but is not limited thereto. Additionally, anomalies may be identified using a rule-based method. According to the rule-based method, a system user (e.g., a system administrator) may define rules to determine whether measured values are anomalies using the API disclosed in FIG. 2. For example, a user may define data points where the temperature of a storage device is greater than a given threshold (e.g., 100 degrees Fahrenheit) as anomaly data using the API.

In some examples, the disclosed systems can identify anomalies using a clustering method. For instance, when the database system executes a data-cleaning operation (e.g., garbage collection) on a storage device, it may preserve the data that are classified as anomalies. When the database system deletes data classified as anomalies, it may subdivide the anomaly data into anomaly clusters according to a clustering algorithm, including, but not limited to, K-Means, principal component analysis (PCA), and/or another algorithm. Data may be removed or filtered such that at least one data point is present in each anomaly cluster, or the cluster with the highest number of data point is preferred for removing data points.

In some embodiments, the disclosed systems can enhance the dataset by oversampling data points having certain characteristics. As mentioned previously, a dataset used for training a storage device failure prediction model may be inherently unbalanced because it may comprise a limited amount of SSD failure data and other anomaly data points (e.g., about 0.01% to about 0.02% of the data set). This can adversely impact the accuracy of the storage device failure prediction model by ignoring a class of data that includes anomalies, failure instances, or other rare events (e.g., data points associated with the minority class of the machine learning training data set). Accordingly, the disclosed systems can generate additional samples of anomalies, failure instances, or other rare events (e.g., the minority class). The additional data points of the minority class can help train the storage device failure prediction model to more accurately predict whether an SSD may fail.

In some embodiments, additional samples of the minority class may be generated using different methods for defining anomaly data. According to an embodiment, the minority data may be generated using a rule-based method. According to the rule-based method, a user can define anomaly data as any data that exceeds a predetermined threshold. One or more rules may be defined corresponding to various failure conditions. Based on the defined criteria that causes data to be classified as anomaly data, additional samples of the anomaly data can be generated. For example, a user may use the API to define temperature measurements associated with a device exceeding about 100 degrees Fahrenheit as anomaly data. Based on this definition, the disclosed systems can generate additional samples of temperature measurements exceeding about 100 degrees Fahrenheit.

In other embodiments, minority class data may be generated using an instance based method. According to an instance based method, a user may specify a sample data point from which additional data points of similar value can be generated. For example, a user may use the API to define temperatures measurements of a storage device near about 100 degrees Fahrenheit as anomaly data. Based on this definition, additional samples of temperature measurements near 100 degrees Fahrenheit, such as 100 and 99 degrees Fahrenheit, may be generated.

In some embodiments, computationally-intensive processes of generating samples can be offloaded to nearby storage devices (e.g., storage devices within a predetermined physical distance or sharing a virtual resource or classification with a given storage device (or similar)) such as nearby SSDs and nearby SSDs with embedded processers.

To further improve the efficiency of sampling the data, the data generated for the training model may be classified according to anomaly definitions set by the user. As data is generated, those data points that meet the anomaly definition provided by the user can be classified and stored in a table. This can allow for more efficient retrieval of those data points without scanning the entire database. In some embodiments, the classified data may be stored on nearby storage devices (e.g., storage devices within a predetermined physical distance or sharing a virtual resource or classification with a given storage device (or similar)) such as a nearby SSD or a nearby SSD with an embedded processor.

Figure 4:
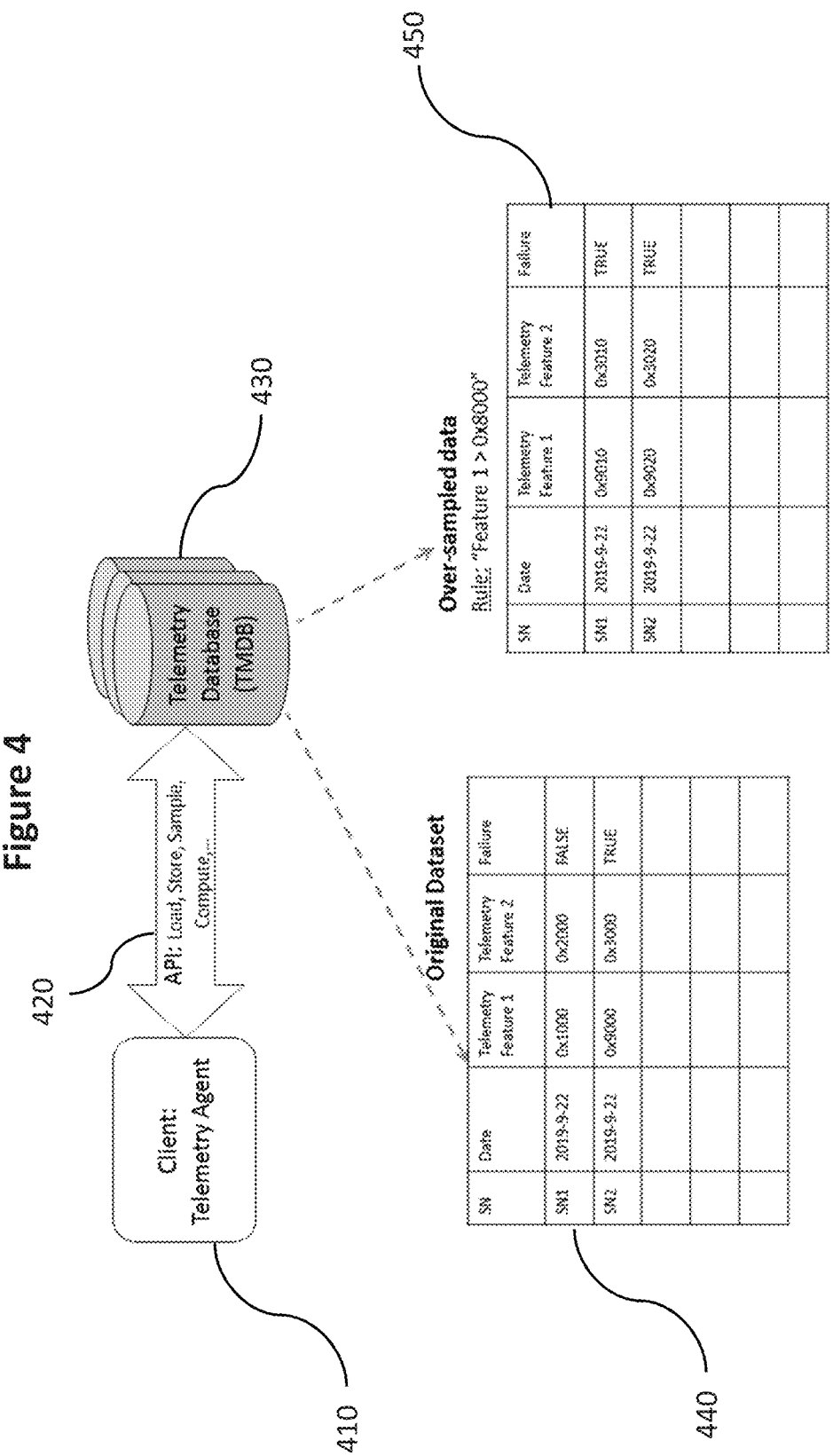
FIG. 4 provides an overview of an example technique for classifying anomaly data, in accordance with example embodiments.

FIG. 4 provides an overview of an example technique for classifying anomaly data, in accordance with example embodiments.

Referring to FIG. 4, a dataset within a database 430 can be used to train a storage device (e.g., SSD) failure prediction model. A client 410 may use the API 420 to set a rule for defining anomaly data in the database 430. For example, the client 410 may set the rule as data showing temperatures less than 100 degrees Fahrenheit. According to this embodiment, data that meet this rule may be identified as anomaly data. The dataset in table 440 may include the dataset of database 430, which may include data that both meets or fails to meet the rule set by the user. For example, data point SN1 fails to meet the rule set by the user, while data point SN2 meets the rule set by the user. Given the relatively large amount of data that may be included in database 430, identifying data that meet the rule set by the user can be computationally burdensome. In some embodiments, the data in database 430 that meet the rule set by the user can be stored in a separate table 450. For example, data points SN1 and SN2 both meet the definition set by the user, and may be identified as anomaly data and stored in table 450. In some embodiments, anomaly data that is generated may also be stored in table 450. By storing the anomaly data in table 450, the anomaly data can be retrieved efficiently without reviewing the entire database 430.

FIG. 5 illustrates a flow diagram illustrating examples operations for training an storage device failure prediction model using a modified dataset, in accordance with example embodiments of the disclosure.

Referring to FIG. 5, a dataset within a database 510 can be used to train an storage device failure prediction model. In 520, the dataset within the database 510 can be segmented into time period intervals (e.g., time period windows). In some embodiments, the windows may be six-month time period intervals. In 530, a weighted value may be assigned to each window. In some embodiments, a greater assigned weighted value can be assigned to more recent data. As mentioned previously, recent data may be considered as having a greater assigned weighted value at least because recent data may more accurately represent the status and/or workload characteristics of the storage device. In 540, data can be selected based on the assigned weighted value. For example, a window can be assigned a weighted value of one, and all data from that window may be selected. In another example, a second window can be assigned a weighted value of one half, and one half of the data from the second window can be selected. In 570, the selected data can be used to train a storage device failure prediction model.

In some embodiments, anomaly data can be selected from a database in 550. Anomaly data may include, but not be limited to, data points associated with instances of SSD failures, and/or other data points that have a relatively small probability of occurring (e.g., outliers). The anomalies may be identified by anomaly detection algorithms such as auto encoder techniques, isolation forest techniques, and/or the like, but is not limited thereto. Additionally, anomalies may be identified using a rule-based method or a clustering method. The selected anomaly data can be used to train the storage device failure prediction model in 570.

In some embodiments, additional anomaly data can be generated in 560. In some embodiments, the anomaly data can be generated using a rule-based method. According to the rule-based method, a user can define anomaly data as any data that exceeds a predetermined threshold. One or more rules may be defined corresponding to various failure conditions. Based on the defined criteria that causes data to be classified as anomaly data, additional samples of the anomaly data can be generated. For example, a user may use an API to define temperature measurements associated with a device exceeding about 100 degrees Fahrenheit as anomaly data. Based on this definition, the disclosed systems can generate additional samples of temperature measurements exceeding about 100 degrees Fahrenheit may be generated. In other embodiments, anomaly data may be generated using an instance-based method. According to an instance based method, a user may specify a sample data point from which additional data points of similar value can be generated. For example, a user may use the API to define temperatures measurements associated with a device near about 100 degrees Fahrenheit as anomaly data. Based on this definition, additional samples of temperature measurements near 100 degrees Fahrenheit, such as 101 and 99 degrees Fahrenheit, may be generated. The generated data can be used to train a storage device failure prediction model in 570.

According to various embodiments of the present invention described herein, a machine learning model can be deployed for predicting whether a storage device may fail in the future based on the storage device's attributes. In some embodiments, the machine learning model can be deployed within a processor such as a general-purpose central processing unit (CPU). In other embodiments, the machine learning model can be offloaded to a nearby storage device such as a nearby SSD (e.g., an SSD within a predetermined distance) or a nearby SSD with an embedded processor.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Features of the inventive concept and methods of accomplishing the same may be understood more readily by reference to the aforementioned detailed description of embodiments and the accompanying drawings. The aforesaid embodiments were described in more detail with reference to the accompanying drawings, in which like reference numbers referred to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of embodiments of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the previous description, for the purposes of explanation, numerous specific details were set forth to provide a thorough understanding of various embodiments. It is apparent, however, that various embodiments may be practiced without these specific details or with one or more equivalent arrangements. Further, one of ordinary skills in the art would appreciate that various features of two or more embodiments described herein may be combined in any suitable manner without departing from the spirit or scope of the present disclosure. In other instances, well-known structures and devices are shown in block diagram form in order to avoid unnecessarily obscuring various embodiments.

It is understood that when an element, layer, region, or component was referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it is understood that when an element or layer was referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicated otherwise. It is further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value. Further, the use of "may" when describing embodiments of the disclosure refers to "one or more embodiments of the disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method for training a machine learning model, the method comprising:
   segmenting, by a processor, a dataset from a database into one or more datasets based on time period windows;
   assigning, by the processor, one or more weighted values to the one or more datasets according to the time period windows of the one or more datasets;
   generating, by the processor, a training dataset from the one or more datasets, wherein an amount of data generated from the one or more datasets is based on the one or more weighted values; and
   training, by the processor, the machine learning model using the training dataset.

2. The method according to claim 1, wherein the machine learning model comprises a solid-state drive (SSD) failure prediction model.

3. The method according to claim 1, wherein a most recent dataset from the one or more datasets is assigned a first weighted value and a least recent dataset from the one or more datasets is assigned a second weighted value, wherein the first weighted value is greater than the second weighted value.

4. The method according to claim 3, wherein the one or more weighted values decrease by a set amount from the first weighted value to the second weighted value.

5. The method according to claim 1, the method further comprising:
   identifying, by the processor, anomaly data in the dataset;
   retrieving, by the processor, the anomaly data in the dataset; and
   adding, by the processor, the anomaly data to the training dataset.

6. The method according to claim 5, wherein the anomaly data comprises SSD failure data.

7. The method according to claim 5, wherein the anomaly data is identified using a rule based method.

8. The method according to claim 5, wherein the anomaly data is identified using a cluster based method.

9. The method according to claim 1, the method further comprising generating, by the processor, anomaly data; and
adding, by the processor, the generated anomaly data to the training dataset.

10. A data system comprising:
a database;
a processor coupled to the database; and
a memory coupled to the processor, wherein the memory stores instructions that, when executed by the processor, cause the processor to:
segment a dataset from the database into one or more datasets based on time period windows;
assign one or more weighted values to the one or more datasets according to the time period windows of the one or more datasets;
generate a training dataset from the one or more datasets, wherein an amount of data generated from the one or more datasets is based on the one or more weighted values; and
train a machine learning model using the training dataset.

11. The data system according to claim 10, wherein the machine learning model comprises a solid-state drive (SSD) failure prediction model.

12. The data system according to claim 10, wherein a most recent dataset from the one or more datasets is assigned a first weighted value and a least recent dataset from the one or more datasets is assigned a second weighted value, wherein the first weighted value is greater than the second weighted value.

13. The data system according to claim 12, wherein the one or more weighted values decrease by a set amount from the first weighted value to the second weighted value.

14. The data system according to claim 10, wherein the processor is further configured to:
identify anomaly data in the dataset;
retrieve the anomaly data in the dataset; and
add the anomaly data to the training dataset.

15. The data system according to claim 14, wherein the anomaly data comprises SSD failure data.

16. The data system according to claim 14, wherein the anomaly data is identified using a rule based method.

17. The data system according to claim 14, wherein the anomaly data is identified using a cluster based method.

18. The data system according to claim 10, wherein the processor is further configured to:
generate anomaly data; and
add the generated anomaly data to the training dataset.

19. A method for training a machine learning model, the method comprising:
identifying, by a processor, anomaly data in a dataset from a database;
generating, by the processor, additional anomaly data;
adding, by the processor, the generated anomaly data to the dataset;
identifying, by the processor, a training dataset from the dataset;
retrieving, by the processor, the training dataset from dataset; and
training, by the processor, the machine learning model using the training dataset.

20. The method according to claim 19, wherein the machine learning model comprises a solid-state (SSD) failure prediction model.

* * * * *